United States Patent Office 3,143,391
Patented Aug. 4, 1964

3,143,391
ALKALI METAL TETRAFLUOROCHLORATES AND THEIR PREPARATION
Thomas J. Hurley, Jr., Niagara Falls, Richard O. Mac-Laren, North Tonawanda, and Ellsworth D. Whitney, Eggertsville, N.Y., assignors to Olin Mathieson Chemical Corporation, a corporation of Virginia
No Drawing. Filed Oct. 12, 1959, Ser. No. 846,035
6 Claims. (Cl. 23—14)

This invention relates to a new class of chemical compounds, alkali metal tetrafluorochlorates of the formula $MClF_4$, where M is an alkali metal, and to a method for their preparation.

The alkali metal tetrafluorochlorates are powdery solids stable at ordinary temperatures. They exhibit powerful oxidizing characteristics and can be used as fluorinating agents in the same manner as are the compounds $KBrF_4$ and $BrF_2SbF_6$ described by Sheft et al. in J.A.C.S., vol. 78, pages 1557–1559 (1956).

The alkali metal tetrafluorochlorates are prepared by the direct reaction of an alkali metal fluoride and chlorine trifluoride. The reaction proceeds slowly at ordinary conditions of temperature and pressure and relatively rapidly at temperatures ranging from 50° to 150° C. and autogenous pressures.

The preparation of the alkali metal tetrafluorochlorates of this invention is described in detail in the following examples. All of the experiments were performed in a nickel bomb which had capacity of approximately 200 ml. and was first wound with a Briskeat heating tape and then wound with asbestos over the heating tape. The bomb was fitted with a Monel needle valve and a 0 to 600 p.s.i.g. gauge. A thermocouple was inserted into the side of the nickel bomb and temperature control was maintained by a pyr-o-vane regulator.

Example I

In this example, 49.2 grams (0.533 mole) of $ClF_3$ were reacted with 9.992 grams (0.070 mole) of cesium fluoride. This corresponds to a molar ratio of cesium fluoride to chlorine trifluoride of 1:7.6. The reaction was performed in the nickel reactor at a temperature of 100° C. for 16 hours. At the end of this time, the reactor was cooled to 0° C. and the excess chlorine trifluoride was allowed to distill under vacuum from the reactor into a trap maintained at −78° C. This procedure was continued until the product in the reactor reached constant weight. There remained in the reactor 15.92 grams of product having 14.4±0.1 percent chlorine and 30.8±0.1 percent fluorine. The product was light pink in color and by weight increase was calculated to have the composition $CsClF_4 \cdot 0.10CsF$. The aforementioned elemental analysis compares favorably with the 13.7 percent chlorine and 30.0 percent fluorine for a product having the composition of $CsClF_4 \cdot 0.10CsF$.

A total of 4.177 grams of the $CsClF_4 \cdot 0.10CsF$ was placed in a nickel tube and slowly heated to 300° C. Observed equilibrium dissociation pressures at several temperatures were obtained. At 300° C. a pressure of 140 mm. had developed in the system. After allowing the $CsClF_4$ to remain at 300° C. for approximately 4 to 6 hours, the decomposition tube was cooled and the contents analyzed. This analysis showed the following results:

| Material | Chlorine, percent | Flourine, percent |
|---|---|---|
| Theoretical for $CsClF_4 \cdot 0.1CsF$ | 13.7 | 30.0 |
| Product of Example I | 14.4±0.1 | 30.8±0.1 |
| After heating product of Example I at 300° C. for 4 to 6 hours | 13.9±0.1 | 29.7±0.1 |

After the above decomposition studies were completed, the sample was found to have lost 88 milligrams (2.1 percent of the total weight of sample). Based upon the weight of product obtained, a 91.0 percent conversion of CsF to $CsClF_4$ was obtained. The density of the $CsClF_4 \cdot 0.1CsF$ was 3.371, 3.432 grams per milliliter.

Example II

In this example, 51.4 grams (0.556 mole) of chlorine trifluoride were reacted with 8.067 grams (0.077 mole) of rubidium fluoride at 100° C. for 16 hours. A product weighing 14.14 grams and containing 15.4±0.3 percent chlorine and 37.3±0.0 percent fluorine was obtained. These analyses compare favorably with the theoretical amount of 16.5 percent chlorine and 36.8 percent fluorine in $RbClF_4 \cdot 0.18RbF$. Based upon the 14.14 grams of product obtained, an 85.2 percent conversion of RbF to $RbClF_4$ was obtained.

Example III

Chlorine trifluoride, 54.5 grams (0.591 mole) was reacted with 4.322 grams (0.074 mole) of potassium fluoride at 100° C. for 48 hours. At the end of this time, 8.303 grams of product containing 14.7±0.2 percent chlorine and 46.7±0.1 percent fluorine were obtained. Based upon the weight of product, a 56.5 percent conversion of KF to $KClF_4$ was obtained. The product, density 2.586 (2.458, 2.563, 2.736) grams/ml., was a white powder having the composition, $KClF_4 \cdot 0.77KF$. The elemental analysis of the product compares favorably with the 18.2 chlorine and 46.5 percent fluorine in the $KClF_4 \cdot 0.77KF$ adduct. Upon the careful addition of water, each of the products obtained in Examples I, II and III reacted violently with the production of white and yellow sparks. After hydrolysis, the resulting aqueous solutions gave very strong potassium iodide tests.

Example IV

Potassium fluoride, 3.236 grams (0.056 mole) was reacted with 58.5 grams (0.634 mole) of chlorine trifluoride and 115.7 grams (0.661 mole) of bromine pentafluoride at 100° C. for 72 hours. At the end of this time, 6.283 grams of a white powder having the composition, $KClF_4 \cdot 0.69KF$ were obtained. The product contained 15.8±0.5 percent chlorine, 46.4±0.1 percent fluorine and 2.5±0.2 percent bromine which compares favorably with the theoretical amount of 18.6 percent chlorine and 46.7 percent fluorine for the aforementioned $KClF_4 \cdot 0.69KF$ adduct. This material reacted violently upon the addition of water. Based upon the weight of the product obtained, a 59.4 percent conversion of KF to $KClF_4$ was obtained.

We claim:
1. Cesium tetrafluorochlorate of the formula $CsClF_4$.
2. Rubidium tetrafluorochlorate of the formula

$RbClF_4$

3. A method for the preparation of an alkali metal tetrafluorochlorate selected from the class consisting of cesium tetrafluorochlorate of the formula $CsClF_4$ and rudibium tetrafluorochlorate of the formula $RbClF_4$ which comprises reacting chlorine trifluoride with an alkali metal fluoride in a confined reaction zone at a temperature of about 50° to 150° C. and at autogenous pressure, and recovering the alkali metal tetrafluorochlorate from the reaction mixture.
4. The method of claim 3 wherein the alkali metal fluoride is cesium fluoride.
5. The method of claim 3 wherein the alkali metal fluoride is rubidium fluoride.

6. A material selected from the class consisting of cesium tetrafluorochlorate of the formula $CsClF_4$ and rubidium tetrafluorochlorate of the formula $RbClF_4$.

References Cited in the file of this patent

Sharpe et al.: "J. Chem. Soc., London," pages 2135–2138 (1948).

Sheft et al.: "J. Am. Chem. Society," vol. 78, pages 1557–1559, April 20, 1956.

Fialkov: "Chem. Abstracts," vol. 49, columns 14552, 14553 (1955, abstract from Izvest. Akad. Nauk S.S.S.R., Otdel, Khin, Nauk, pages 972–982 (1954).

Simons: "Fluorine Chemistry," vol. I, pages 189–200 (1950); vol. II, pages 39–49 (1954).